US 6,591,541 B1

(12) United States Patent
Cummings

(10) Patent No.: US 6,591,541 B1
(45) Date of Patent: Jul. 15, 2003

(54) FISHING TACKLE HOLDER

(76) Inventor: Berton L. Cummings, 1710 Steiner, Monroe, MI (US) 48162

( * ) Notice: Subject to any disclaimer, the term of this patent is extended or adjusted under 35 U.S.C. 154(b) by 0 days.

(21) Appl. No.: 09/992,311

(22) Filed: Nov. 19, 2001

(51) Int. Cl.[7] ............................................... A01K 97/10
(52) U.S. Cl. ........................ 43/21.2; 248/514; 248/515
(58) Field of Search ..................... 43/21.2; 248/223.41, 248/514, 515, 518, 454, 458; 403/84; D22/147

(56) References Cited

U.S. PATENT DOCUMENTS

| | | | |
|---|---|---|---|
| 1,985,985 A | | 1/1935 | Gerline |
| 2,037,709 A | * | 4/1936 | Doyle ..................... 188/228.6 |
| 2,851,234 A | | 9/1958 | Scheifele |
| 3,162,408 A | | 12/1964 | Markman |
| 3,516,190 A | | 6/1970 | Cook |
| 3,929,365 A | * | 12/1975 | Hunt et al. ................. 81/53.12 |
| 4,049,225 A | * | 9/1977 | Chasen et al. ........... 248/219.4 |
| 4,064,811 A | | 12/1977 | Copeland |
| 4,093,171 A | | 6/1978 | Mengo, Sr. |
| 4,226,394 A | * | 10/1980 | Einhorn ....................... 24/716 |
| 4,551,939 A | * | 11/1985 | Kitchens ...................... 248/513 |
| 5,040,759 A | | 8/1991 | Wainwright |
| 5,054,737 A | | 10/1991 | DeLancey |
| D332,299 S | * | 1/1993 | Dryna et al. ................ D22/147 |
| 5,369,971 A | * | 12/1994 | Sheppard ...................... 70/416 |
| 5,438,789 A | | 8/1995 | Emory |
| 5,756,912 A | | 5/1998 | Liao |
| 5,761,844 A | | 6/1998 | Horschel |
| 5,871,196 A | | 2/1999 | Martelli |
| 6,037,538 A | * | 3/2000 | Brooks ......................... 174/48 |
| 6,266,850 B1 | * | 7/2001 | Williams et al. ........ 144/136.95 |

* cited by examiner

Primary Examiner—Charles T. Jordan
Assistant Examiner—Tara M Golba
(74) Attorney, Agent, or Firm—Lynn E. Cargill

(57) ABSTRACT

A fishing tackle holder, including an elongated channel piece with lipped edges, a mounting bracket having either a substantially diamond-shaped or a round base portion for slidably mounting within the channel, a fastener to hold the mounting bracket in the channel, an adjuster to position a barrel sleeve which holds a fishing rod, and a lock down to hold the barrel sleeve in place. The fishing tackle holder may also include eyelets on the side of the barrel sleeve, with a securing cord to hold the fishing rod so that a fish will not pull the fishing rod out of the barrel sleeve.

20 Claims, 8 Drawing Sheets

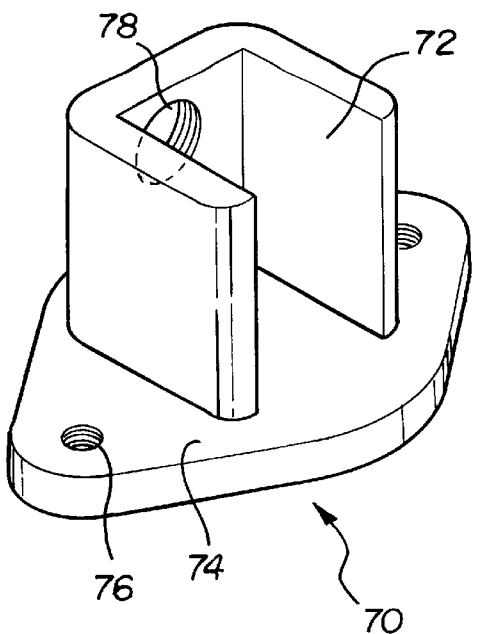
_FIG-3_
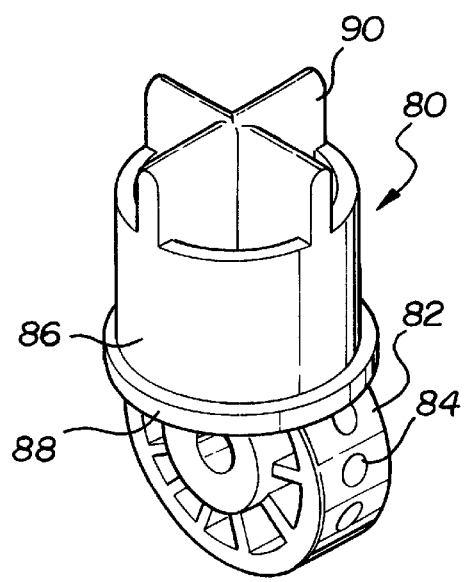
_FIG-4_
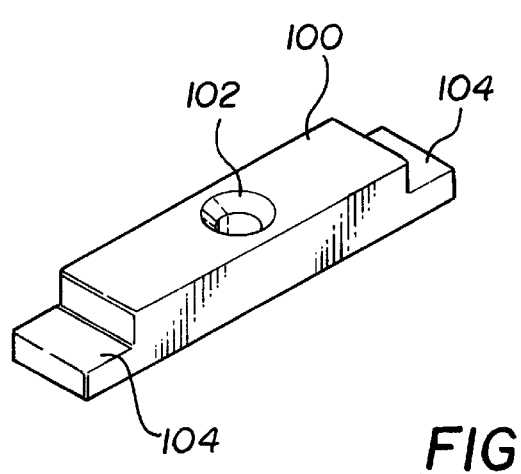
_FIG-5_

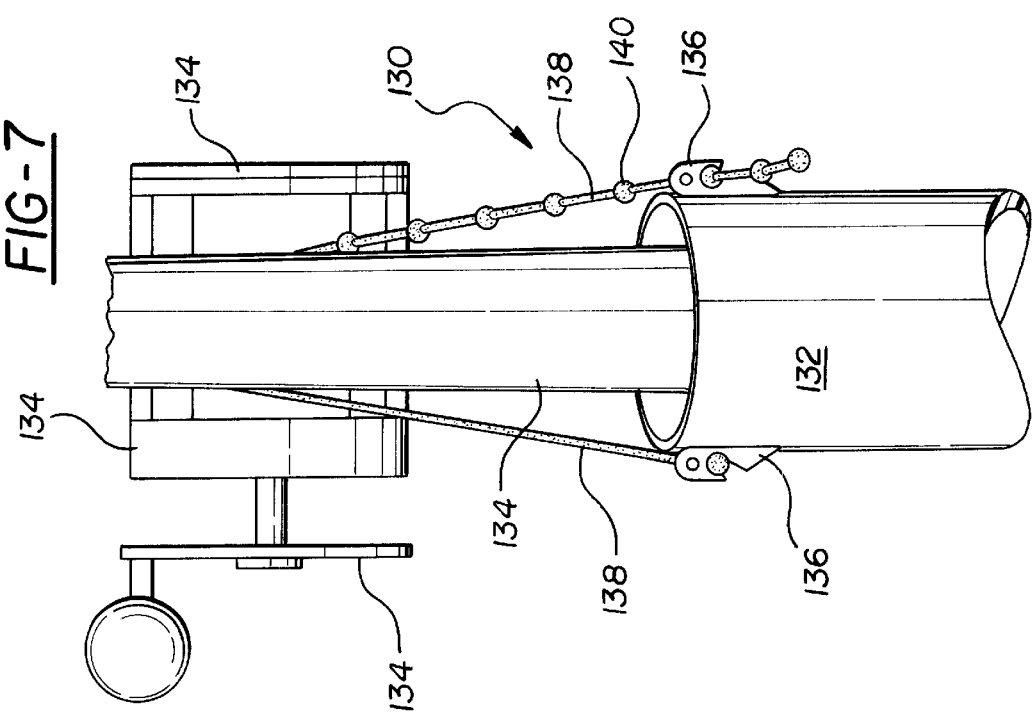
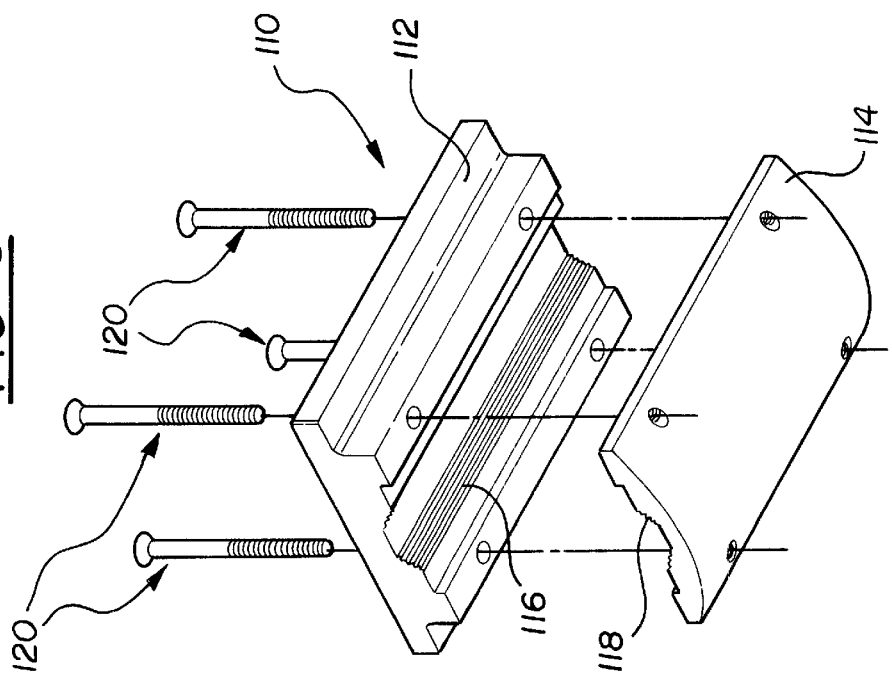

FISHING TACKLE HOLDER

TECHNICAL FIELD

This invention relates generally to fishing tackle holders, and more particularly to a versatile and adjustable fishing tackle holder for attachment to a boat.

BACKGROUND OF THE INVENTION

Fishing has become a favorite past time of millions of people in the United States and around the world. It is desirable for aiding in the fishing to provide a system which can easily and adjustably carry fishing tackle such that the lines will not tangle when they are extending off the back or the sides of a boat. In one conventional fishing tackle holder disclosed in U.S. Pat. No. 5,438,789 issued Aug. 8, 1995, to John E. Emory, a mounting assembly was provided that included a channel for slideably receiving a square mounting plate which only allowed for two orientations of the fishing rod, facing straight back or exactly 90° to the side. The square mounting plate included a plurality of fasteners for securing the plate in one of two fixed locations within the channel. Various pieces could then be mounted to the mounting plate by a variety of brackets. A disadvantage of these prior art mounting assemblies is that they did not allow rotation of the mounting bracket about an axis which is perpendicular to the channel when the mounting bracket is in the channel, thereby allowing directional pre-determination for the fishing rod. Besides, this prior art design limits the placement of items to be put into the channel relative to the side rail. In addition, the prior art channel designs included a smooth base, which made it difficult to secure the mounting plate in a fixed location relative to the channel.

Besides the above-described prior art design, a wide variety of rod holders have been proposed and placed on the market. The prior art systems may be attached to the gunwale of a boat, or the sides of a boat, and are generally designed to support a single fishing rod. These other prior art assemblies, once they have been mounted at the desired location on a boat, generally permit the angle of inclination of the rod to be adjusted, but in a planer fashion and do not give three-dimensional adjustability. The above-described advancement included adjustability in two directions and was the subject of the Emory patent in which the rod holder can be inclined backward and forward, and to and fro. However, this prior art invention does not give the full range of positioning adjustability which is desirable by modern day fisherman.

It is, therefore, an object of the present invention to provide a fully adjustable fishing rod holder which can accommodate many different accessories, besides the rod holders, including, but not limited to, down riggers, cup holders, cutting boards, mounting brackets, step pads, stanchion supports, and the like.

Further, it is an object of the present invention to provide a mounting bracket which is adapted for attachment to a round or square railing on a fishing boat or a pontoon boat.

It is still yet another objective of the present invention to provide a new fishing rod holder sleeve having a means for holding the fishing rod within the sleeve so that a fish cannot pull the fishing rod out of the fishing rod holder sleeve.

SUMMARY OF THE INVENTION

Therefore, in accordance with the present invention, there is provided a new fishing tackle holder assembly, railing mount, and fishing rod holder which totally fulfill the objects described hereinabove. In general, the present invention is first directed towards a fishing tackle holder for attaching to a boat including an elongated channel piece having a u-shaped or an h-shaped cavity or cavities, and the channel is adapted to be mounted on a boat. A mounting bracket for receiving the fishing tackle therein has a base portion which may be any non-square configuration, but is preferably round or substantially diamond-shaped with rounded corners. The base portion includes at least one fastening mechanism, such as a screw or other mechanism, to fasten the base portion of the mounting bracket within the elongated channel piece. The round shape base portion allows the base to be secured in an infinitely variable configuration with a sweep angle of 360°. The rounded off diamond shape allows the base portion to be cocked in a number of various directions, such that the side angle of the mounting bracket can "sweep" from one direction to the other within a 70° arc. When these adjustment capabilities are combined with the capability of the fishing rod holder being adjustable in a nearly infinite array of angles from 180° backward to forward, this gives a great deal of capability to the fishermen to perfectly angle and predetermine where the fishing rod will end up. The barrel sleeve fishing rod holder is attached to the mounting bracket by a concentric adjuster having adjustment apertures around its circumference. The concentric adjuster is pivotally mounted within the mounting bracket and is secured by various means, as more fully discussed hereinbelow, to affect the adjustment. A lockdown for securing the concentric adjuster is attached to the mounting bracket, and thereby fixes the position of the fishing rod holder assembly.

In anther aspect of the present invention, a mounting bracket is utilized for adapting the channel to a railing on a boat, when no other surfaces are present. The mounting bracket has the capability of being secured to either round railings found on most boats or square railings, such as those found on pontoon boats. There is preferably a flat upper surface with screw holes tapped therein to receive either the adjustable rod holders of the present invention, or permanent angle rod holders of the prior art. Other accessories may be mounted onto the flat surface. The top of the plate may be pre-drilled for universal use by most downriggers and swivel mounting bases of other manufacturers.

In yet still another aspect of the present invention, there is disclosed a new type of barrel sleeve for holding the fishing rod holder having eyelets extending outwardly from the circumference of the barrel sleeve, such that a fishing rod can be inserted into the sleeve, and a fishing rod and reel holder, preferably a flexible string, rope, or stretchy cord, is attached to the eyelets and wrapped around the fishing rod itself to be used to hold the reel and rod into the fishing tackle holder.

Furthermore, one of ordinary skill in the art will appreciate the various accessories which can be placed into the channel, including cup holders, cutting boards, step pads, tool caddies, fishing hook holders, and the like.

BRIEF DESCRIPTION OF THE DRAWINGS

FIG. 3 is a perspective view of the preferred mounting bracket of the present invention, and shows tapped holes for fastening mechanism;

FIG. 4 is a perspective view of the concentric adjuster having the barrel sleeve support attached thereto;

FIG. 5 is a perspective view of the end cap to be slid into the channel for securing all the other pieces therein;

FIG. 6 is an exploded view of the mounting bracket to be used on a railing, showing the grooves for preventing spinning about the railing;

FIG. 7 is a front elevation view of the portion of the barrel sleeve showing the eyelets and a flexible cord attached to the rod and reel to prevent the rod and reel from coming out of the sleeve;

FIG. 10 is a side elevational view of an end piece to be received at the end of the channel, showing complementary tapped holes for a screw-in;

Therefore, there is shown and described new forms of fishing tackle holders, railing mounts and a new device to prevent a fishing rod from being pulled out of the holder.

DETAILED DESCRIPTION OF THE INVENTION

Figure 1:
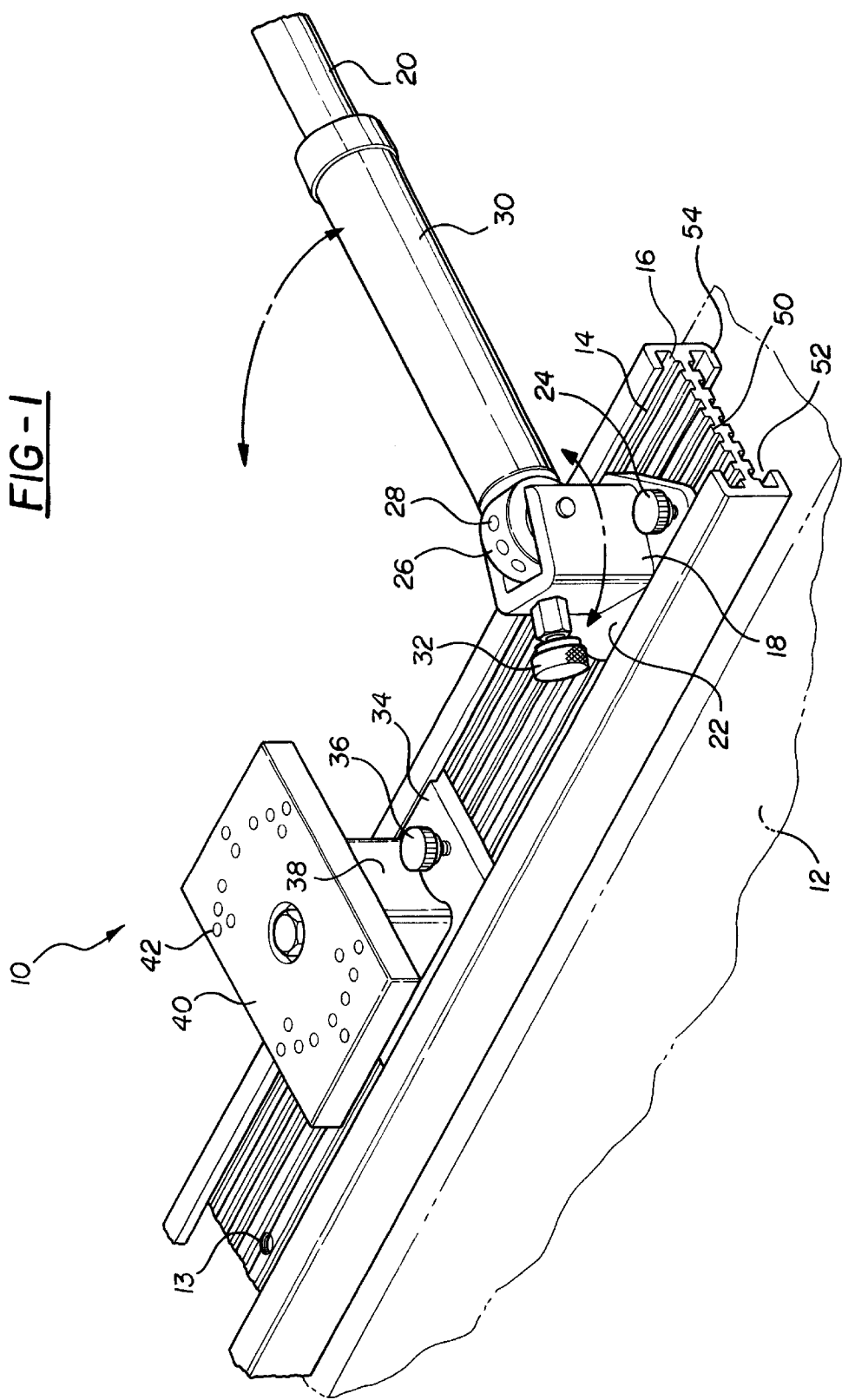
FIG. 1 is a perspective view of a fishing tackle holder made in accordance with the present invention, showing a single rod holder in a channel and a stanchion support and bracket.

Therefore, in accordance with the present invention, there is provided a new and novel fishing tackle holder, several mounting bracket designs, concentric adjuster design, railing clip and rod and reel securement device, in addition to a new adjustment means for the fishing rod holder itself. These various embodiments are illustrated in FIGS. 1–9 and the first figure, FIG. 1, generally denotes the fishing tackle holder by the numeral 10. In FIG. 1, the fishing tackle holder 10 is secured to gunwale 12 of a boat by fastener 13. Fasteners 13 are located throughout the channel 14 and are utilized for securing the channel 14 to gunwale 12. Channel 14 is shown in this embodiment with an H-shaped cavity having a lipped surface 54 defining a channel 14 for receiving mounting bracket 18. Fishing tackle 20 may be a fishing rod or other fishing tackle, and is received within fishing rod holding barrel sleeve 30. The mounting bracket 18 includes two portions, including a substantially diamond-shaped base portion 22 having rounded edges. The fastening mechanism 24 is shown and also appears on the other side of the mounting bracket. Mounting bracket 18 also has a portion which extends upwardly from base portion 22, and is generally of a U-shape, wherein the opening of the U runs parallel to the plane of base portion 22. In the back of mounting bracket 18 there may also be an adjuster 32 which in this configuration can be pulled out and then reinserted to mate with adjustment apertures 28 of concentric adjuster 26, held pivotally within mounting bracket 18. As can be seen from the drawings, a projection from adjuster 32 will extend through the body of mounting bracket 18, and be seated within the adjustment apertures 28 at a predetermined and desirable level of angle of inclination.

Mounting base 18 may include a base portion 22 having either a substantially diamond-shaped configuration with rounded corners, or may be made of a circular configuration further discussed hereinbelow. The substantially diamond-shaped configuration allows the mounting bracket 18 to be cocked from one angle to another, with a sweep angle of about 70°. Due to the substantially diamond-like shape, the mounting bracket will find support under lip 54 of channel 14, and can be adjusted by loosening fastening mechanism 24 and re-adjusting the angle of the barrel sleeve 30. For example, a fisherman might want to have his fishing tackle extend towards the starboard portion of the boat and then may decide, for whatever reason, that he wishes the fishing tackle to extend to the port side. He merely needs to loosen the fastening mechanisms and cock the base portion to the other side. Due to the relatively flat portions of the diamond-shaped base portion, all pressure that is placed upon the base portion will be evenly spread against the interior of lipped portion 54 of channel 14 without removing the base portion from the channel. Previously, prior art devices utilized a square configuration and the entire mounting bracket needed to be removed from the channel and re-inserted in order to change direction of the fishing tackle. Furthermore, this only allowed two positions, one which was 90° from the other, and did not allow adjustment of the sweep angle of 70° such as in the present invention. This adjustability capability is very advantageous and is well received by consumers in the fishing tackle market.

Looking again to FIG. 1 there are also shown grooves 50 in the channel 14, which aids in securing the mounting bracket into place using fastening mechanisms 24. It is envisioned by the inventor that the H-shaped cavity may also just include a U-shaped cavity such as shown later in FIG. 2. Also illustrated in FIG. 1 is the inclusion of a stanchion support 34 which is received within the U-shaped cavity 16 of channel 14. The stanchion support 34 includes a stanchion fastener 36 for securing the stanchion at a particular location along the length of the channel. Stanchion 38 allows raised base plate 40 to receive downriggers or other tackle holders. Base plate 40 is generally made of a thick aluminum top plate which is predrilled for universal use of most downriggers and swivel mounting braces of other manufacturers. Stanchion 38 can be a permanently mounted plate, or can also include a swivel base which utilizes the same base plate configuration 22 as shown earlier. The adjustable base plate configuration is located under top plate 40, and although not shown in this illustration, it is clearly envisioned by the inventor.

All of the articles shown in FIG. 1 are capable of being made by many manufacturing techniques, as will be known to one of ordinary skill in the art. Of particular interest, the channel 14 may be made of any suitable material, although it is preferably aluminum and may be made from approximately ¼" thick to approximately 1½" thick for large applications. Concentric adjuster 26 may include up to ten different adjustment apertures 28, and more preferably includes about five adjuster apertures to give 90° of latitude for placement of the barrel sleeve 30, and consequently fishing tackle 20. Concentric adjuster 26 may be manufactured by any suitable means, including being machined of aluminum, die cast, injection molded of a relatively high impact and high strength plastic or any other suitable forming means. The angle between adjustment apertures 28 can be evenly disbursed so as to yield a 90° adjustability for barrel sleeve 30. Barrel sleeve 30 may be made of any suitable material, including plastic, wood, aluminum, other metals, but is most preferably made of aircraft-quality aluminum with each component being buffed, polished and anodized. The working components are preferably made of stainless steel to provide strength and prevent corrosion. Furthermore, barrel sleeve 30 and mounting bracket 18 may be painted, chromed, dipped, sprayed or powder coated to provide desirable colors and/or finishes. In the event of powder coating, all powder-coated colors are painted over anodized finishes for maximum protection and resistance to outer elements on the boats.

It should be noted that the barrel sleeve 30 is utilized for holding any fishing tackle, which may include fishing rods, nets, or any other fishing equipment which is standard and known one to ordinary skill in the fishing art.

Moving now to FIG. 3, a mounting bracket is generally denoted by numeral 70, and includes upwardly extending U-shaped portion 72 attached or molded integrally with base portion 74. The apertures 76 are shown to receive fastening means for use within the channel as shown in the earlier figures. There is also an adjuster aperture 78 extending through the upwardly extending portion 72 which was shown in FIG. 1 to receive adjuster 32. The substantially diamond-shaped base portion 74 includes rounded edges, which adds to the ease of insertion into channel 14, and can more clearly be seen in this diagram as having an infinite set of angles from a sweep angle of 70° which is possible. Of course, other angles are possible, in which the substantially diamond-like shape may more closely resemble a square with rounded corners such that it can be cocked from one position to another within the channel, without needing to be slid out of the channel and reinserted. However, this configuration shown in FIG. 3 is the most preferable because it gives the greatest variety of angles while providing the utmost support and sturdy connection to the boat. A round base plate is also envisioned.

Moving now to FIG. 3, a mounting bracket is generally denoted by numeral 70, and includes upwardly extending U-shaped portion 54 attached or molded integrally with base portion 74. The apertures 76 are shown to receive fastening means for use within the channel as shown in the earlier figures. There is also an adjuster aperture 78 extending through the upwardly extending portion 72 which was shown in FIG. 1 to receive adjuster 32. The substantially diamond-shaped base portion 54 includes rounded edges, which adds to the ease of insertion into channel 14, and can more clearly be seen in this diagram as having an infinite set of angles from a sweep angle of 70° which is possible. Of course, other angles are possible, in which the substantially diamond-like shape may more closely resemble a square with rounded corners such that it can be cocked from one position to another within the channel, without needing to be slid out of the channel and reinserted. However, this configuration shown in FIG. 3 is the most preferable because it gives the greatest variety of angles while providing the utmost support and sturdy connection to the boat. A round base plate is also envisioned.

Referring next to FIG. 4, a concentric adjuster is generally denoted by numeral 80, and illustrates the adjustment wheel and barrel sleeve support. The adjustment wheel is shown as numeral 82, and includes adjustment apertures 84 therethrough. The barrel sleeve support 86 is shown as extending upwardly from the adjustment wheel 82, and includes a base lip portion 88 which serves as a stop for the barrel sleeve 30 which is inserted over the barrel sleeve support 86. Optional reinforcing ribs 90 may be utilized to add strength to the configuration. Although barrel sleeve 30 is not shown inserted thereover, we refer you to FIG. 1 to see how the adjustment wheel is inserted within barrel sleeve 30. Other configurations of the adjustment wheel are envisioned by the present inventor, including an integral adjustment wheel and barrel sleeve, which can be molded out of plastic in one piece. In the event that aluminum tubing is used for the barrel sleeve, the concentric adjuster 80 of FIG. 4 is most advantageous for inserting into the bottom of the barrel sleeve. Adjustment wheel 82 may also have many different configurations for being adjustable, as is known to those who have ordinary skill in the art.

Figure 2:
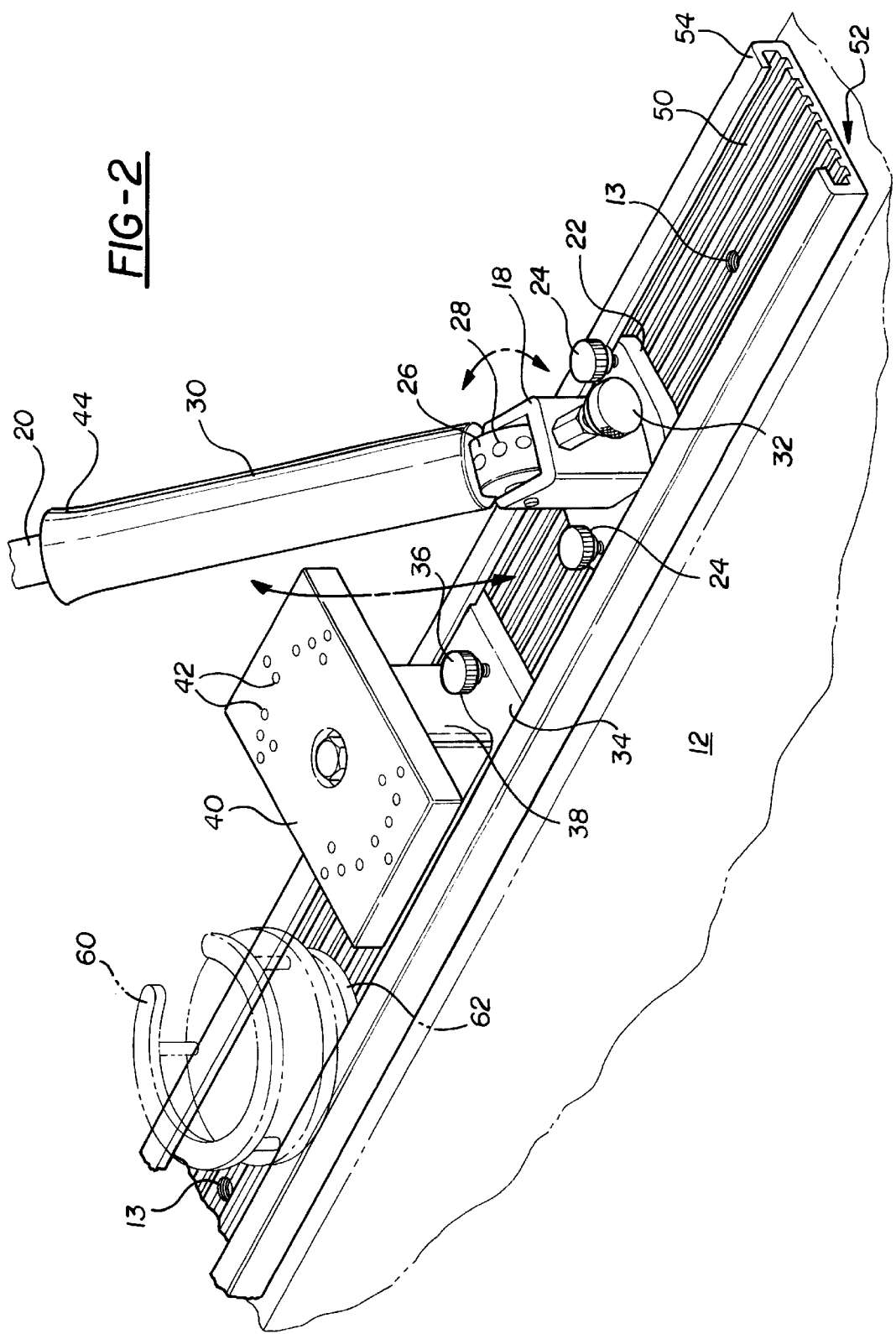
FIG. 2 is another perspective view showing the adjustability of the elliptically shaped base-portion, a stanchion support and bracket, and a cup holder.

With a view to FIG. 5, there is an end cap 100 shown having a hole 102 tapped therethrough to allow the use of a fastening mechanism to secure it within a channel 14 as illustrated in FIGS. 1 and 2. The channel extensions 104 are to be received under lip 54 of channel 14. This end cap 100 may be utilized for securing various components within the channel so that they do not slide around, or so that nothing can slide off of the end of the channel.

Turning now to FIG. 6, there is shown another aspect of the present invention which includes a railing mount system for use on railings where a gunwale is not available on a boat. The railing mount is generally denoted by numeral 110 and includes a flat mounting plate 112 which is located above the under-rail securing plate 114. Mounting piece 110 includes grooved surfaces 116 to catch a railing so that the mounting piece 110 does not spin around a round railing piece. Once tightened down, it is my experience that the grooved railing mount does not spin on a round railing. Also note that there are indentations for receiving a square railing, such as those commonly found on pontoon boats. Needless to say, the railing mount will not spin on a square railing. Furthermore, fasteners 120 are used to capture the mounting piece 110 onto and over the railing piece. Flat mounting plate 112 is adapted for receiving a H-shaped channel piece as shown in FIG. 1. The mounting plate 112 may be inserted into the bottom channel of the H-shaped cavity of the channel piece, and then all of the other accessories, such as barrel sleeve 30 or stanchion support 40, can be mounted thereon. Alternatively, fishing tackle holders may be secured directly to the mounting plate 112. This mounting piece 110 significantly increases the applicability of the fishing tackle holder to many other types of boats, which, until now, did not have an option for utilizing fishing tackle holders as those described in the present invention. Furthermore, prior art swivel mechanisms for holding fishing tackle were not heretofore useable.

Looking next to FIG. 7, there is yet another aspect of the present invention illustrated, which includes the fishing rod lock-in assembly generally denoted by the numeral 130. Barrel sleeve 132 may have a cylindrical configuration, or may also have a flanged lip as shown in FIG. 2 as numeral 44. The new and novel portion of this aspect of the invention includes the eyelets 136 which have been either added to or molded integral with barrel sleeve 132. Eyelets 136 are adapted for receiving a flexible fishing rod holder 138 which may be made of any material known, but is especially useful by utilizing a bungee cord or other flexible cording. Illustrated in FIG. 7 is a particular custom-made cord for this exact application, in which the material utilized is similar to those used in O-rings, such as black rubber. As shown, fishing rod and reel 134 is shown inserted into barrel sleeve 132 and secured in place by flexible fishing rod holder 138. In this particular embodiment, adjustment stops 140 are molded into the O-ring material-like flexible fishing rod holder 138. These adjustment stops 140 are caught underneath the eyelet lips. In this aspect of the invention, the flexible fishing rod holder 138 prevents rod and reel 134 from coming out of barrel sleeve 132 in the event that a big fish is caught. This prevents the loss of expensive fishing tackle which can be yanked out of the barrel sleeve by a large fish, or if the line becomes caught on something.

Figure 8:
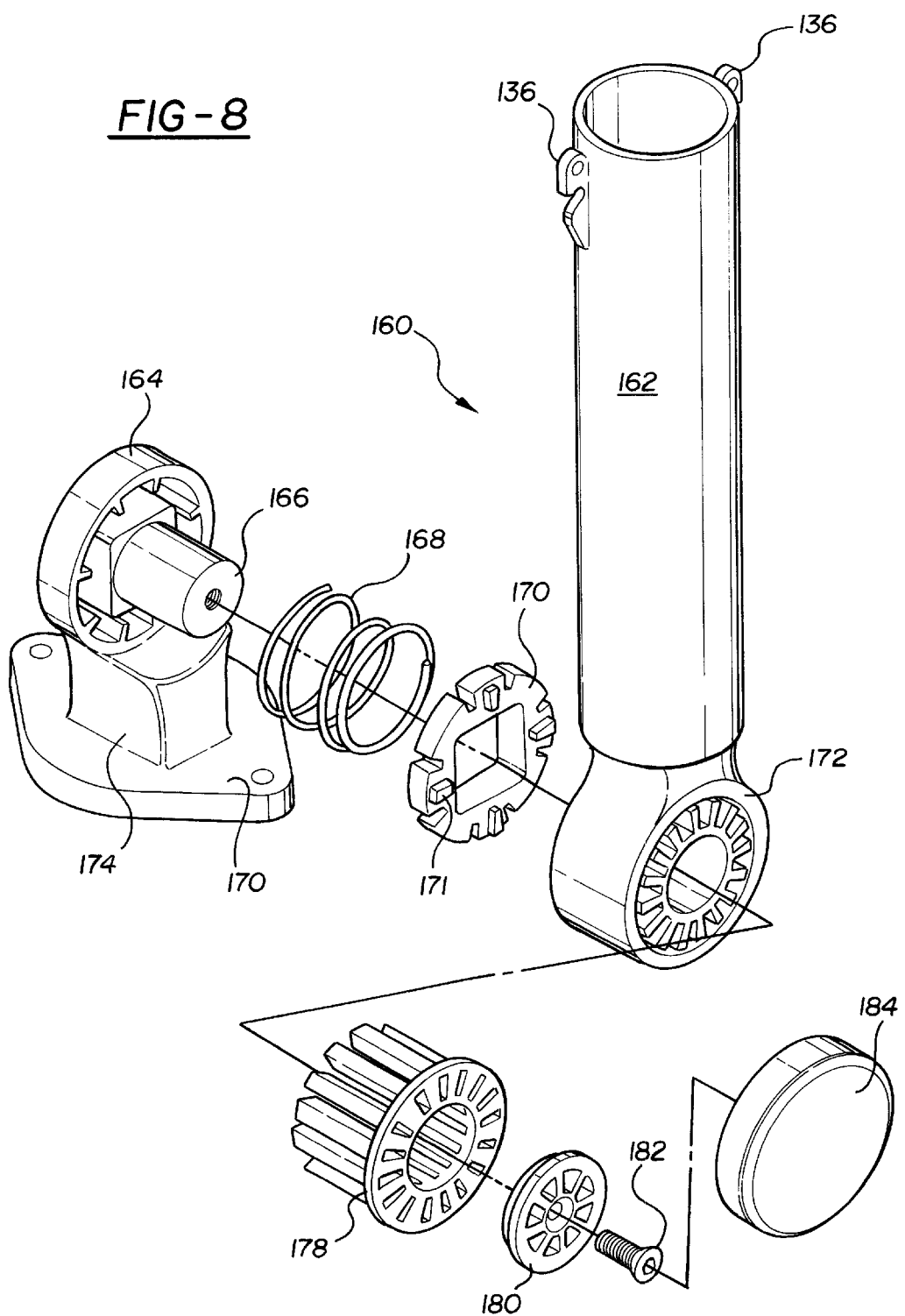
FIG. 8 is an exploded view of the inside mechanism of a squeezable, adjustable locking device in accordance with the present invention.

Onto FIG. 8, there is shown yet another aspect of the present invention which includes an adjustment device which is another embodiment from the concentric adjuster as illustrated in FIGS. 1, 2 and 4. The fishing tackle holder of this embodiment is generally denoted by the numeral 160, and includes a barrel sleeve 162 which is integral with a positioning cog 172. Although this part can be machined, it is preferably made of injection molded plastic, and can be molded as one piece. Note that eyelets 136 are near the top of barrel sleeve 162. This assembly includes a stationary lock ring 164 having a mounting hub 166 for receiving spring 168 and sliding lock ring 170. Lock ring 170 includes lock ring protrusions 171 extending outwardly. Protrusions 171 may number from at least two protrusions to about twenty protrusions for greater strength, once engaged within the channels in positioning cog 172. Stationary lock ring 164 is molded integral with and/or attached to a standoff 174 from base portion 176. An adjustment barrel 178 having "fingers" extending therethrough is held in place by a centering washer 180 and a screw or other fastening mechanism 182. Cap 184 is to be used by the operator which receives pressure applied thereon so that the barrel sleeve 162 can be freed up when both caps 164 and 184 are squeezed together. When they are squeezed together, the adjustment barrel 178 presses against the outer periphery of sliding lock ring 170 and pushes it back to a position which allows the positioning cog 172 to spin freely until the desired position is achieved. Once the desired position is located, the pressure against cap 184 is released, allowing adjustment barrel 178 to return to its previous position, pushed back by spring 168, and allowing sliding lock ring 170 to be pushed back into a locking position. The four cogwheels of sliding lock ring 170 act to secure the positioning cog 172 in position and will not allow it to move.

Figure 9:
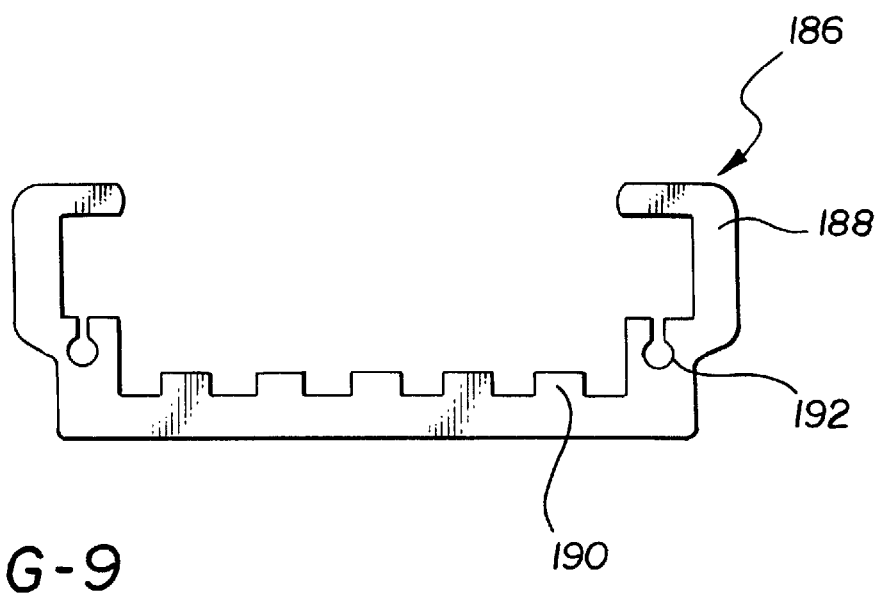
FIG. 9 is a side elevational view of the end of the channel, illustrating the placement of tap holes to receive an end piece as in FIG. 10.
Figure 10:
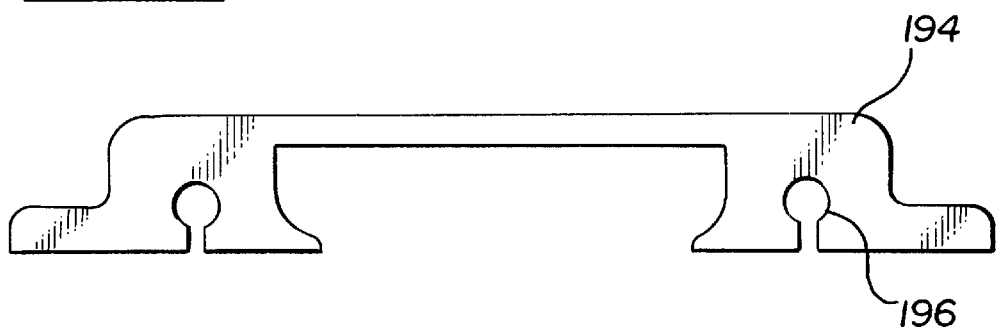

With combined reference to FIGS. 9 and 10, there is shown the end of a channel made in accordance with the present invention, generally denoted by numeral 186 and including upwardly extending lip channel portions 188. The grooves 190 are found on the floor of the channel, while there is tapped screw bosses 192 at the end in order to receive a screw put through screw boss 196 shown in FIG. 10. The end cap 194, shown in FIG. 10, is meant to be placed against the end of channel 186 as shown in FIG. 9, with the screw boss 196 mating with the complementary screw boss 192 of channel 186. In practice, the channel 186 is secured to a surface of a boat, and all of the various components are slid within the channel, including the fishing rod holder, cup holders, steps, and other instruments which are mentioned hereinabove. Thereafter, end cap 194 is placed up against the edge and screwed to the channel through screw bosses 196 and 192. The upwardly extending portions of end cap 194 act as a "stop" to prevent any of the items that have been inserted into the channel from falling out. Even though FIG. 5 illustrates a stop tile 100, the end cap 194 of FIG. 10 is another embodiment for placement at the end of the channel, while stop tile 100 is designed to be used within the channel and may be used to separate various items and hold them in place within the channel.

Figure 11:
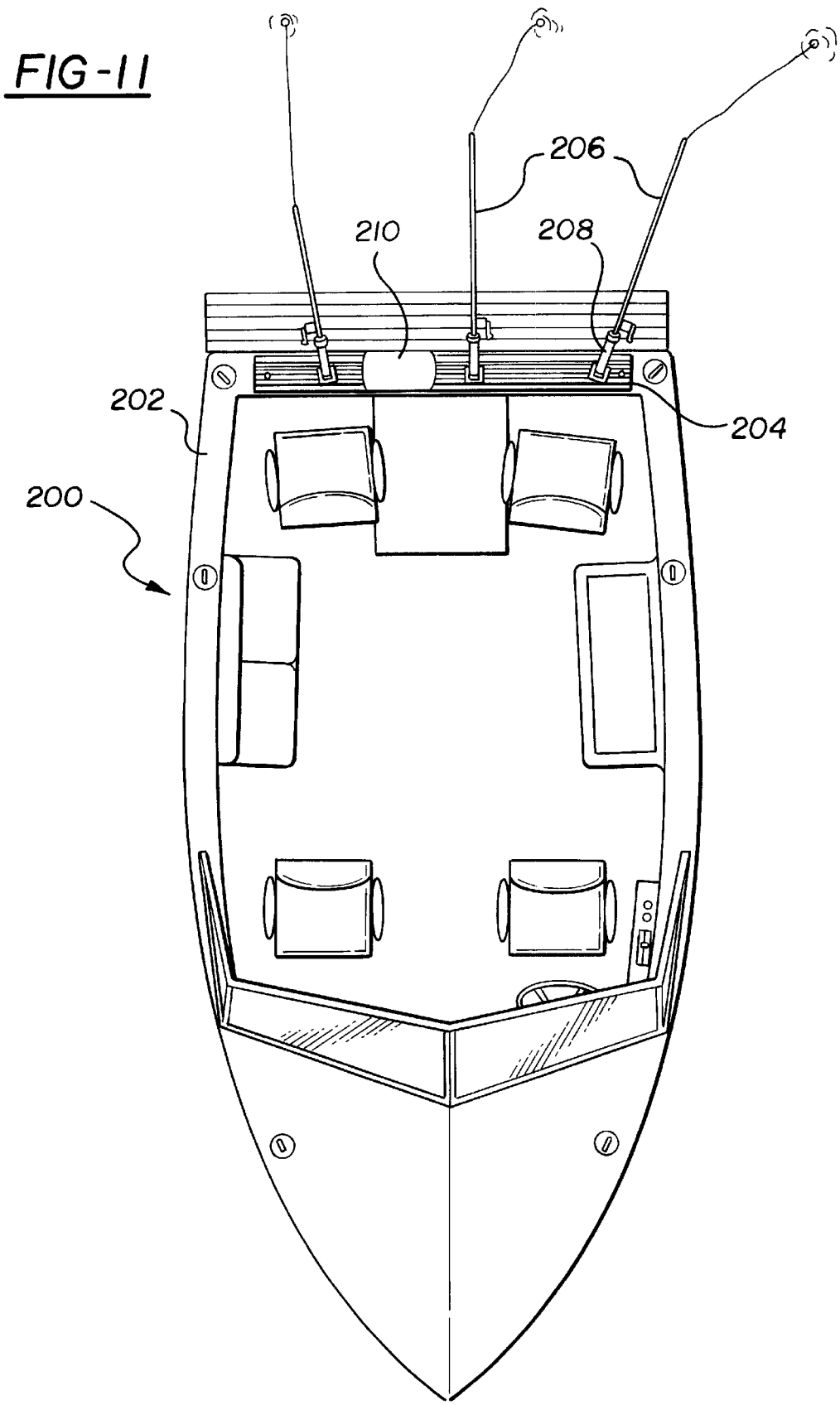
FIG. 11 is a top plan view of a boat with several of the fishing tackle holders shown mounted and in place.

In FIG. 11 there is illustrated a boat 200 showing gunwale 202 having an elongated channel piece 204 mounted thereon. Fishing rods 206 are shown in position within fishing tackle holders 208. A channel-mounted step pad 210 is also shown illustrated, which is yet another accessory which can be slid into the channel of the present invention. The step pad may be of a normal step pad configuration, and may include a standoff with a base portion that is adapted to be received within the channel and may be secured by fastening mechanisms, generally known in the art, including screws and other fasteners. FIG. 9 shows that the tackle holder can angle the fishing rods in various configurations such that the lines from the fishing rods to not become tangled if the boat is moving or standing still.

Figure 12:
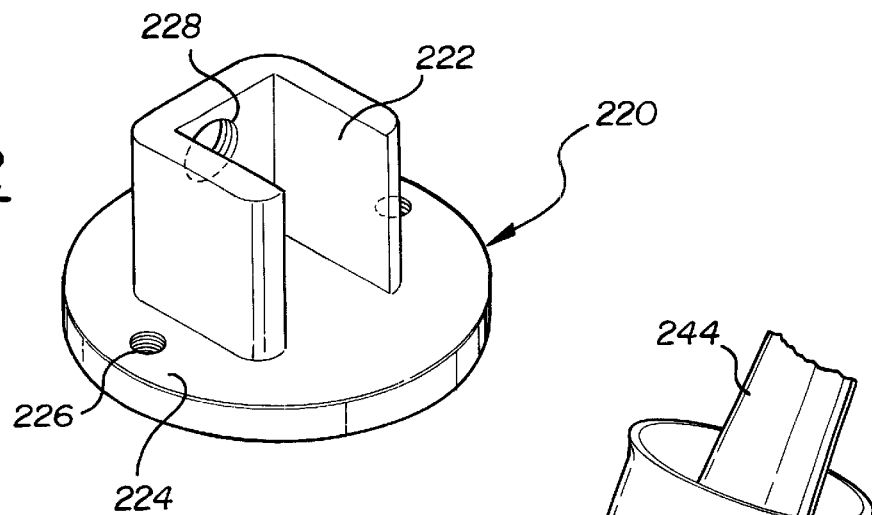
FIG. 12 is a perspective view of a circular mounting bracket.

FIG. 12 illustrates another configuration of the preferred embodiment of the mounting bracket, generally denoted by numeral 220. Mounting bracket 220 includes an upwardly extending receiver 222 for the adjustment wheel. The difference between this embodiment and that as illustrated in FIG. 3 is that the base portion 224 is a round disk having apertures 226 for fastening means to extend therethrough. As the base portion 224 is round, it may be slid into the channel shown in FIGS. 1, 2 and 9, and may be infinitely adjustable due to its round shape. While the substantially diamond-shaped base portion shown in FIG. 3 is adjustable within a sweep angle of 70°, the round configuration of the embodiment shown here in FIG. 12 is infinitely adjustable throughout a full 360° turn. Needless to say, the present inventor also envisions base portion 224 having various other configurations, including square, rectangular, polyhedral, and having many different angles such as a pentagon or a hexagon. The base portion may be machined out of aluminum or may be a die casting of aluminum or zinc or combinations thereof, in addition to any pourable material. Furthermore, the entire mounting bracket 220 may be made of injection molded plastic or any other suitable material that can be formed into a desired shape. These materials are also suitable for all of the equipment and components shown for this entire invention. Further included is an adjustment aperture 228 for use with the adjustment wheel as shown in FIGS. 1, 2 and 4.

Figure 13:
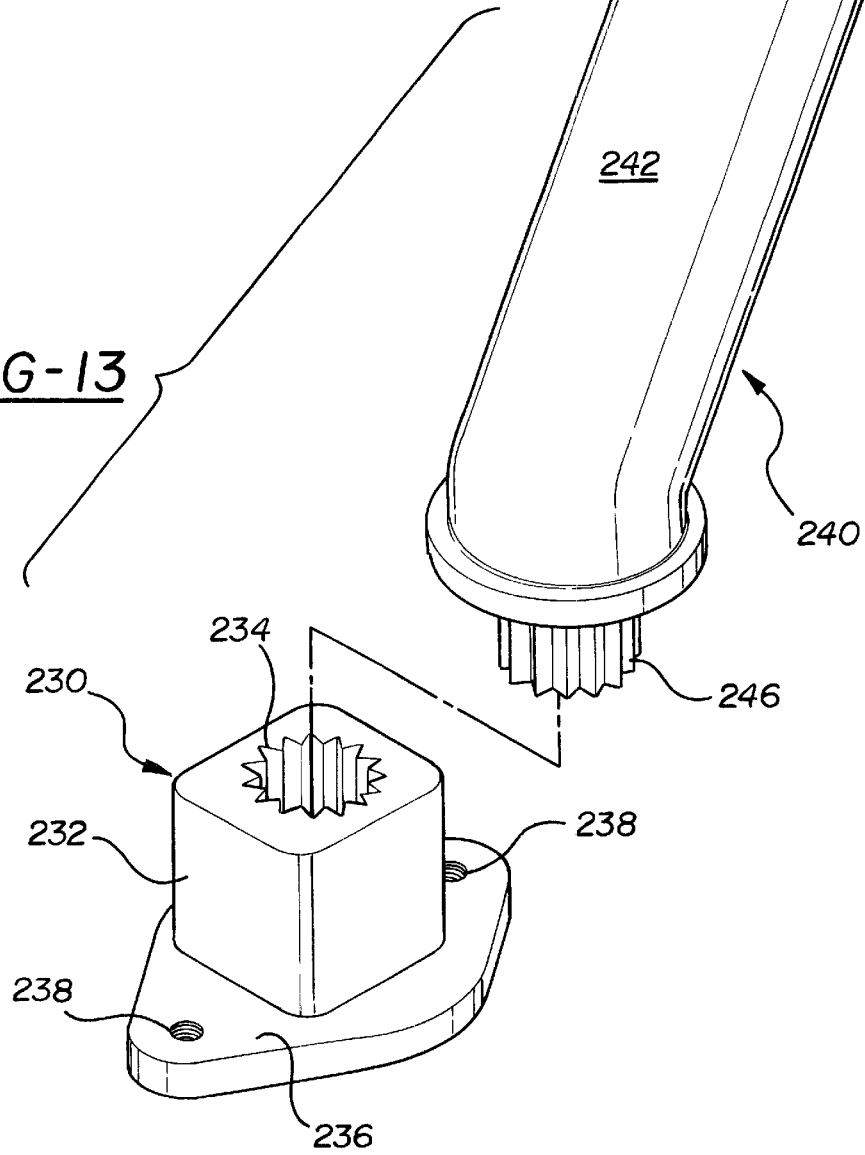
FIG. 13 is a perspective view of a variably adjustable peg mount bracket for receiving a peg mount at the end of a complementary fishing rod holder.

The mounting bracket shown in FIG. 13 is generally denoted by numeral 230, and illustrates a mounting bracket having a base portion 236 which is substantially diamond-shaped with rounded corners. As discussed above with reference to FIG. 12, the base portion 236 may also be of any suitable configuration as discussed above. However, for purposes of this illustration, we will discuss the base portion as having a substantially diamond shape with rounded corners. Mounting bracket 230 includes an upwardly extending receiver 232 having a star-shaped receiving aperture 234 throughout the center of it. Apertures 238 for fastening means are included in base portion 236. In yet another embodiment of the present invention, the fishing tackle holder 240 includes a barrel sleeve 242 for holding a fishing rod 244 with a star-shaped peg mount 246 extending from the bottom of the tackle holder. Star-shaped peg mount 246 is adapted for being perfectly received within the star-shaped receiving aperture 234. Adjustment in the position of the fishing rod 244 can be made by lifting the fishing holder 242 and setting it down with another angle within receiving aperture 234. Depending upon the number of "points" in the star-shaped receiving aperture 234, there are many angles which are possible for the barrel sleeve 244 to direct the fishing rod 244. As one can image, all of these components may be made of any of the materials which were described hereinabove with reference to FIG. 12. One of ordinary skill in the art may know of a more suitable method of manufacturing the above-described components.

Therefore, the above description and drawings have shown a new fishing tackle holder, in accordance with the present invention, having advantages over the prior art. The various components of the present invention in its many aspects are all part of a single assembly which allows a fisherman to maximize his fishing experience. Although the invention has been described hereinabove, the invention is limited only to its scope as defined by the appended claims.

What is claimed is:

1. A fishing tackle holder for attachment to a surface on a boat, comprising:

an elongated channel piece having a U-shaped cavity with lipped edges extending upwardly, said channel being adapted to be mounted on a boat;

said elongated channel piece including grooves in the U-shaped cavity;

a mounting bracket for securing fishing tackle, said mounting bracket having a substantially diamond-shaped base portion with rounded corners;

said mounting bracket including at least one fastening mechanism to fasten the base portion of the mounting bracket within the grooves of the U-shaped cavity of the elongated channel piece, thereby alleviating slippage of the fastening mechanism within the channel piece;

said base portion being adapted for slidably mounting and rotating within the channel cavity, and further wherein the at least one fastening mechanism is used to secure the mounting bracket in position within the grooves of the channel, such that the fishing tackle secured thereto may be rotated and secured substantially horizontally in a plane parallel to the channel piece with an infinitely adjustable sweep angle of up to 70° so that numerous fishing poles may be utilized on the same boat without tangling the lines;

said mounting bracket also having a U-shaped portion secured to the top of the base portion;

a concentric adjuster having adjustment apertures around its circumference to be received within the U-shaped portion of the mounting bracket, said adjuster being pivotally mounted within the mounting bracket such that the angle of inclination can be set;

a barrel sleeve attached to and extending from the concentric adjuster, said barrel sleeve adapted for receiving a fishing rod, said barrel sleeve being hollow and adapted to hold fishing tackle therein while fishing; and a lock-down for securing the concentric adjuster to a predetermined angle of inclination, said lock-down having an extension which projects into the concentric adjuster to hold the barrel sleeve in place, which consequently holds the fishing tackle, at a predetermined angle of inclination with respect to plane of the channel piece, whereby the fishing tackle holder may be adjustably rotated and secured horizontally in a plane parallel to the channel piece within a 70° arc due to the substantially diamond-shaped base portion so that the fishing tackle may be most advantageously placed both vertically and horizontally.

2. The fishing tackle holder as in claim 1, wherein the grooved channel piece is a two-sided H-shaped channel with lipped edges extending upwardly.

3. The fishing tackle holder as in claim 1, wherein the mounting bracket is a die cast piece.

4. The fishing tackle holder as in claim 1, wherein the concentric adjuster has at least five apertures.

5. The fishing tackle holder as in claim 1, wherein the barrel sleeve includes it a flanged outer lip.

6. The fishing tackle holder as in claim 1, wherein the lock-down includes an exterior screw pull-out with an extension which projects into the concentric adjuster.

7. The fishing tackle holder as in claim 1, wherein the lock-down includes an interior squeeze-adjustable cog wheel configuration.

8. The fishing tackle holder as in claim 1, further comprising an appendage having eyelet holes and catches extending out from either side of the barrel sleeve and a flexible cord for securing the fishing tackle which is received within the eyelet holes and the catches, so that the fishing tackle will not be pulled out of the barrel sleeve when a fish is caught.

9. A fishing tackle holder for attachment to a surface on a boat, comprising:

an elongated channel piece having a U-shaped cavity with lipped edges extending upwardly, said channel being adapted to be mounted on a boat;

said elongated channel piece including grooves in the U-shaped cavity;

a mounting bracket for securing fishing tackle, said mounting bracket having a substantially rounded base portion;

said mounting bracket including at least one fastening mechanism to fasten the base portion of the mounting bracket within the grooves of the U-shaped cavity of the elongated channel piece, thereby alleviating slippage of the fastening mechanism within the channel piece;

said base portion being adapted for slidably mounting and rotating within the channel cavity, and further wherein the at least one fastening mechanism is used to secure the mounting bracket in position within the grooves of the channel, such that the fishing tackle secured thereto may be rotated and secured substantially horizontally in a plane parallel to the channel piece with an infinitely adjustable rotation sweep angle, to be set at a predetermined direction off the boat so that numerous fishing poles may be utilized on the same boat without tangling the lines;

said mounting bracket also having a U-shaped portion secured to the top of the base portion;

a concentric adjuster having adjustment apertures around its circumference to be received within the U-shaped portion of the mounting bracket, said adjuster being pivotally mounted within the mounting bracket such that the angle of inclination can be set;

a barrel sleeve attached to and extending from the concentric adjuster, said barrel sleeve adapted for receiving a fishing rod, said barrel sleeve being hollow and adapted to hold fishing tackle therein while fishing; and a lock-down for securing the concentric adjuster to a predetermined angle of inclination, said lock-down having an extension which projects into the concentric adjuster to hold the barrel sleeve in place, which consequently holds the fishing tackle, at a predetermined angle of inclination with respect to the channel piece, whereby the fishing tackle holder may be adjustably rotated and secured horizontally in a plane parallel to the channel piece over a 360° arc due to the substantially rounded base portion so that the fishing tackle may be most advantageously placed both vertically and horizontally.

10. The fishing tackle holder as in claim 9, wherein the grooved channel piece is a two-sided H-shaped channel with lipped edges extending upwardly.

11. The fishing tackle holder as in claim 9, wherein the mounting bracket is a die cast piece.

12. The fishing tackle holder as in claim 9, wherein the concentric adjuster has at least five apertures.

13. The fishing tackle holder as in claim 9, wherein the barrel sleeve includes a flanged outer lip.

14. The fishing tackle holder as in claim 9, wherein the lock-down includes an exterior screw pull-out with an extension which projects into the concentric adjuster.

15. The fishing tackle holder as in claim 9, wherein the lock-down includes an interior squeeze-adjustable cog wheel configuration.

16. The fishing tackle holder as in claim 9, further comprising an appendage having eyelet holes and catches extending out from either side of the barrel sleeve and a flexible cord for securing the fishing tackle which is received within the eyelet holes and the catches, so that the fishing tackle will not be pulled out of the barrel sleeve when a fish is caught.

17. A fishing tackle holder for attachment to a surface on a boat, comprising:

an elongated channel piece having a U-shaped cavity with lipped edges extending upwardly, said channel being adapted to be mounted on a boat;

said elongated channel piece including grooves in the U-shaped cavity;

a mounting bracket for securing fishing tackle, said mounting bracket having a rotatable base portion adapted for sliding and rotating within the channel piece;

said mounting bracket including at least one fastening mechanism to fasten the base portion of the mounting bracket within the grooves of the U-shaped cavity of the elongated channel piece, thereby alleviating slippage of the fastening mechanism within the channel piece;

wherein the at least one fastening mechanism is used to secure the mounting bracket in position horizontally within the grooves of the channel, such that the fishing tackle secured thereto may be rotated and secured substantially horizontally with an infinitely adjustable sweep angle, to be set at a pre-determined direction off the boat so that numerous fishing poles may be utilized on the same boat without tangling the lines;

a vertical inclination securing device and adjuster for the fishing tackle holder, said adjuster being pivotally mounted such that the angle of inclination with respect to the channel piece can be set;

a barrel sleeve attached to and extending from the vertical inclination securing device and adjuster, said barrel sleeve being adapted for receiving a fishing rod, said barrel sleeve being hollow and adapted to hold fishing tackle therein while fishing; and a lock-down for securing the vertical inclination adjuster to a predetermined angle, said lock-down having an extension which projects into the vertical inclination adjuster to hold the barrel sleeve in place, which consequently holds the fishing tackle, at a predetermined angle of inclination with respect to the channel piece, whereby the fishing tackle holder may be adjustably rotated and inclined both horizontally and vertically so that the fishing tackle may be most advantageously placed both horizontally and vertically.

18. The fishing tackle holder as in claim 17, wherein the mounting bracket is a die cast piece.

19. The fishing tackle holder as in claim 17, wherein the barrel sleeve includes a flanged outer lip.

20. The fishing tackle holder as in claim 17, further comprising an appendage having eyelet holes and catches extending out from either side of the barrel sleeve and a flexible cord for securing the fishing tackle which is received within the eyelet holes and the catches, so that the fishing tackle will not be pulled out of the barrel sleeve when a fish is caught.

* * * * *